April 12, 1938.    R. W. SUMAN    2,113,666
SHEAR PIN ALARM
Filed June 5, 1937
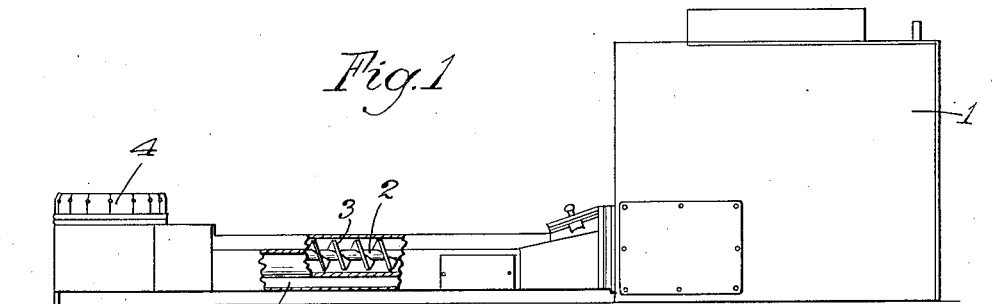
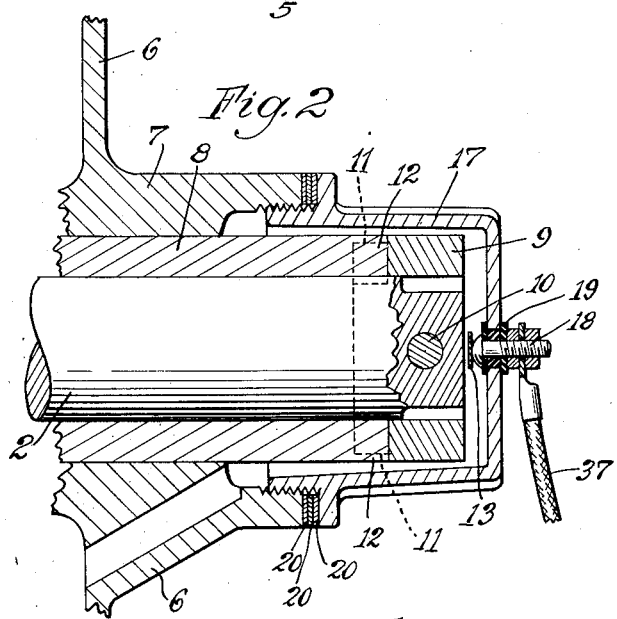
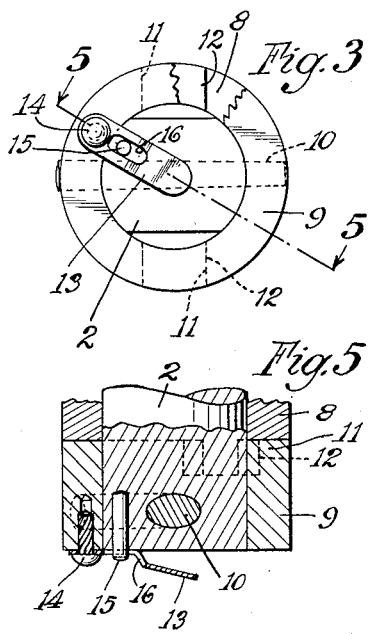
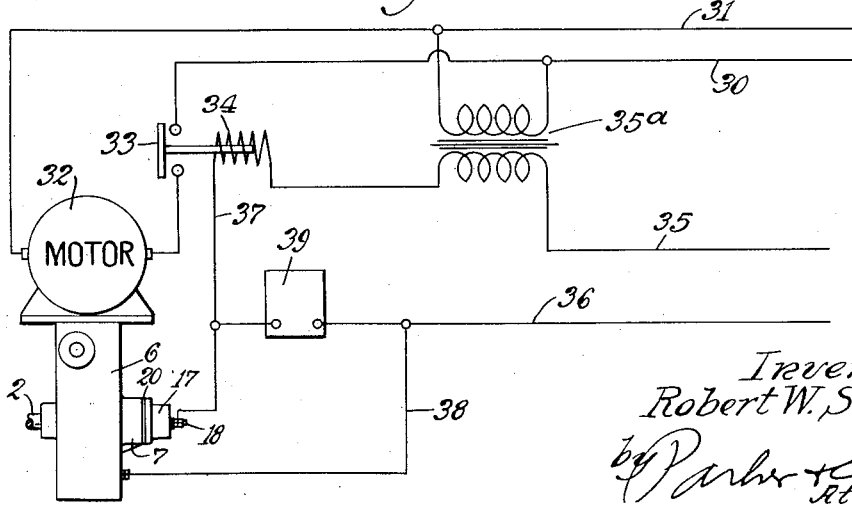
Inventor
Robert W. Suman
by Parker & Carter
Attorneys Patented Apr. 12, 1938

2,113,666

UNITED STATES PATENT OFFICE 2,113,666

SHEAR PIN ALARM

Robert W. Suman, Chicago, Ill., assignor to Link-Belt Company, Chicago, Ill., a corporation of Illinois Application June 5, 1937, Serial No. 146,698

11 Claims. (Cl. 192—150)

My invention relates to improvements in shear pin alarm and has for one object to provide an alarm device which will automatically go into operation in the event that a shear pin is broken.

My invention is especially applicable to use in connection with mechanical stokers for furnaces and the like, wherein a slow motion shaft is driven from a motor through a suitable gear reduction and drives the screw to feed the fuel. The connection between the shaft and the gear reduction is enclosed within the housing and it sometimes happens that the shear pin interposed between the shaft and the gear transmission may be broken so that the motor will continue to operate without any coal being fed. Such a situation is disadvantageous in the extreme, but does not immediately make itself known to the user of the stoker and so it is of the utmost importance that he should know as soon as it takes place of the fact that sufficient resistance has built up somewhere in the fuel feed system to cause a breakage of the shear pin in order that he may be able to take steps in ample time to remedy the difficulty. It will of course be understood that the shear pin alarm and the general apparatus for notifying the user of the breakage of the drive connection is applicable to many other purposes where such a device may be of value.

My invention is illustrated more or less diagrammatically in the accompanying drawing wherein:

Figure 1 shows a diagrammatic side elevation of a stoker with parts cut away;

Figure 2 shows a longitudinal section on an enlarged scale through the end of the slow motion shaft;

Figure 3 is an end view of the device shown in Figure 2;

Figure 4 is a wiring diagram; and

Figure 5 is a section on line 5—5 of Figure 3.

Like parts are indicated by like numerals throughout the specification and drawing.

1 is the stoker housing. It contains a hopper for coal, a motor, a fan, drive means whereby the motor drives the fan and, through a gear reduction not shown, drives the slow speed screw conveyor shaft 2, which shaft drives the screw conveyor 3 to feed coal from the hopper housing 1 to the fire pot 4 in the usual manner. The fan also supplies air through the conduit 5 to the fire pot. 6 is a subhousing contained within the housing 1 and enclosing the gear reduction. It includes a bearing sleeve 7 in which rotates the hub 8 driven by the speed reduction gear not shown. 9 is a shear pin collar on the shaft 2 and held against rotation with respect thereto by means of a shear pin 10, which passes through holes in the collar and the shaft. Clutch teeth 11, 12 on the shear pin collar 9 and the sleeve or hub 8 interlock so that when the hub 8 rotates it drives the shear pin collar and the shear pin collar drives the shaft through the shear pin.

13 is a contact spring mounted on the shear pin collar 9 by means of a screw 14 and held by that screw tight enough so that while the spring normally assumes the radial position shown in Figure 3, it can, if sufficient pressure is applied, be rotated about the axis of the screw 14. 15 is an alarm control pin in the screw conveyor shaft 2. It engages a slot 16 in the spring 13. If there is relative angular displacement of the shaft 2 and the shear pin collar 9, this pin engaging the spring will cause the spring to rotate about the axis of the screw 14 away from its radial position.

17 is a hub cap threaded in the hub 7 and enclosing the end of the shaft 2 and the shear pin collar 9. Centrally disposed in this hub cap is a contact screw 18 insulated from the hub cap by insulating washers 19. This screw in the working position, as shown in Figure 2, is in contact with and closes a circuit through the contact spring 13, but when this spring is rotated out of its radial position, as above referred to, it disengages from the screw 18 and breaks the circuit. 20, 20 are gaskets to limit the inward movement of the hub cap to prevent binding of that cap on the end of the shaft and to adjust the position of the cap so as to insure a proper electric contact between the spring 13 and the screw 18.

Any suitable electric wiring system or diagram may be used. I have illustrated one which I prefer. Line current comes in through the wires 30, 31 to the motor 32, being controlled at the switch 33 by the relay 34. 35 is a transformer, one circuit of which is in parallel with the line 31, the other in series with the relay 34 and with the circuit operating controls not shown, through the wires 35, 36. The wire 37 leads from the relay 34 to the contact screw 18, the wire 38 from the gear case 6 to the conductor 36, leading to the operating controls. 39 is an alarm in parallel with the circuit breaker at 17, 18, 38. The resistance of the alarm is such that as long as the circuit is closed between the spring 13 and the screw 18 and through the gear case, the alarm is idle, but as soon as the shear pin breaks, the motor continues to operate, causing rotation of the shear pin sleeve without rotation of the slow speed shaft. The resulting relative angular displacement of the screw 14 and pin 15 will swing the contact spring 13 out of its radial position and out of contact with the screw 18, thus breaking the circuit. Under these circumstances, the current passes through the alarm and operates it.

It will be understood, of course, that under some circumstances different mechanisms can be used for accomplishing the same purpose, that a different wiring circuit can be used, and that my invention is not limited to the particular details set out. Under some circumstances, also, the alarm is so arranged electrically that when it is thrown in series with the standard stoker control relay, as a result of the breakage of the circuit at the slow motion shaft, the current flow would be reduced so that the relay will drop out and the motor will then stop operation while the alarm still continues to operate.

I claim:

1. In combination, a driven shaft, a drive sleeve encircling it, a shear pin collar encircling the shaft and held against angular displacement with respect to the sleeve, a shear pin passing through the collar and the shaft, a contact spring pivoted on the collar, slotted intermediate its ends, a pin in the shaft engaging the slot and adapted normally to hold the spring in radial position with respect to collar and shaft and adapted upon relative angular movement of collar and shaft to rotate the spring about its pivot on the collar out of radial position, a cap enclosing the end of the shaft and collar, an insulated contact member supported thereby concentric with the shaft and adapted to engage the spring when it is in radial position and to be out of contact with it when the spring is moved out of radial position, and an electric circuit including the shaft, the spring, and the contact pin and adapted to be broken when the spring is moved from radial position.

2. In combination, a driven shaft, a drive sleeve encircling it, a shear pin collar encircling the shaft and held against angular displacement with respect to the sleeve, a shear pin passing through the collar and the shaft, a contact spring pivoted on the collar, slotted intermediate its ends, a pin in the shaft engaging the slot and adapted normally to hold the spring in radial position with respect to collar and shaft and adapted upon relative angular movement of collar and shaft to rotate the pin about its pivot on the collar out of radial position, a cap enclosing the end of the shaft and collar, an insulated contact member supported thereby concentric with the shaft and adapted to engage the spring when it is in radial position and to be out of contact with it when the spring is moved out of radial position, and an electric circuit including the shaft, the spring and the contact pin and adapted to be broken when the spring is moved from radial position, a motor adapted to drive the drive sleeve and means responsive to the breaking of the electric current to stop the operation of the motor.

3. In combination, a driving and a driven member, a connection between them adapted to yield when a predetermined load has been reached, and means responsive to relative movement of the driving and driven member for giving an indication of such movement, the indicating means including a member mounted in part upon the driving and in part upon the driven member and adapted to be displaced by their relative movement, such means including a fixed contact member, the movable member being normally in contact with it, and being adapted when displaced from the contact member by the relative movement of the driving and driven member to open an electric circuit.

4. A shear pin alarm comprising a driving and a driven member, a shear pin interposed between and adapted to take the drive between them and adapted to yield when a predetermined load has been reached, and means responsive to relative movement of the driving and driven member for indicating such movement, the indicating means including a member mounted in part upon the driving and in part upon the driven member and adapted to be displaced by their relative movement, such means including a fixed contact member, the movable member being normally in contact with it, and being adapted when displaced from the contact member by the relative movement of the driving and driven member to open an electric circuit.

5. In combination, a shaft, a drive sleeve encircling it, a collar encircling the shaft, a driving connection between it and the sleeve, an overload release interposed between the collar and the shaft, a conductor spring pivoted on the collar, means of the shaft for holding it in radial position with respect to the shaft and the collar, a fixed contact member normally in engagement with the spring, the means on the collar and shaft associated with the spring being adapted to move the spring out of radial position and disengage it from the contact member upon relative angular movement of shaft and collar, an electric circuit including the spring and contact member.

6. In combination, a shaft, a drive sleeve encircling it, a collar encircling the shaft, a driving connection between it and the sleeve, an overload release interposed between the collar and shaft, a member at the end of and normally in radial position with respect to the collar, sleeve, and shaft, a connection between this radial member and the collar and shaft, an electric circuit including the radial member, a fixed contact adapted to be in engagement with the radial member but to be disengaged therefrom to break the circuit when angular displacement of the collar and shaft move the radial member out of its radial position.

7. In combination, a shaft, a drive sleeve encircling it, a collar encircling the shaft, a driving connection between it and the sleeve, an overload release interposed between the collar and shaft, a member at the end of and normally in radial position with respect to the collar, sleeve, and shaft, a connection between this radial member and the collar and shaft, and an electric circuit including the radial member, a fixed contact adapted to be in engagement with the radial member but to be disengaged therefrom to break the circuit when angular displacement of the collar and shaft move the radial member out of its radial position, the radial member comprising an arm in pivotal relation to the collar and the shaft and held in position by such pivot relations, the pivot points of this arm being spaced away from the center of rotation of the shaft.

8. In combination, a shaft, a sleeve on the shaft, a collar and a brake pin interposed between the sleeve and shaft, a housing enclosing the end of the shaft and its associated parts, a contact button on the housing, a radial member extending across the end of the shaft and sleeve pivoted on the shaft and sleeve and held by them in radial position in contact with the contact button, the connections between the radial member and the shaft and sleeve being such that relative angular movement between the shaft and sleeve swings the member out of radial position and disengages it from the contact button.

9. In combination, a driven shaft, a drive sleeve encircling it, a shear pin collar encircling the shaft and held against angular displacement with respect to the sleeve, a shear pin passing through the collar and the shaft, a contact spring pivoted on the collar, slotted intermediate its ends, a pin in the shaft engaging the slot and adapted normally to hold the spring in radial position with respect to collar and shaft and adapted upon relative angular movement of the collar and shaft to rotate the spring about its pivot on the collar out of radial position, a contact member mounted concentric with the shaft and adapted to engage the spring when it is in radial position and to be out of contact with it when the spring is moved out of radial position, and an electric circuit including the shaft, the spring, and the contact pin and adapted to be broken when the spring is moved from radial position.

10. In combination, a driven shaft, a drive sleeve encircling it, a shear pin collar encircling the shaft and held against angular displacement with respect to the sleeve, a shear pin passing through the collar and the shaft, a contact spring pivoted on the collar, slotted intermediate its ends, a pin in the shaft engaging the slot and adapted normally to hold the spring in radial position with respect to collar and shaft and adapted upon relative angular movement of collar and shaft to rotate the pin about its pivot on the collar out of radial position, a contact member mounted concentric with the shaft and adapted to engage the spring when it is in radial position and to be out of contact with it when the spring is moved out of radial position, and an electric circuit including the shaft, the spring and the contact pin and adapted to be broken when the spring is moved from radial position, a motor adapted to drive the drive sleeve and means responsive to the breaking of the electric circuit to stop the operation of the motor.

11. In combination, a shaft, a sleeve on the shaft, a collar and a brake pin interposed between the sleeve and shaft, a contact button and means for supporting it adjacent the axis of the shaft, a radial member extending across the end of the shaft and sleeve pivoted on the shaft and sleeve and held by them in radial position in contact with the contact button, the connections between the radial member and the shaft and sleeve being such that relative angular movement between the shaft and sleeve swings the member out of radial position and disengages it from the contact button.

ROBERT W. SUMAN.